April 14, 1942. G. R. SCOTT 2,279,414
WORM FOR USE IN DOUBLE ENVELOPING WORM GEARING
Filed Oct. 24, 1940 2 Sheets-Sheet 1
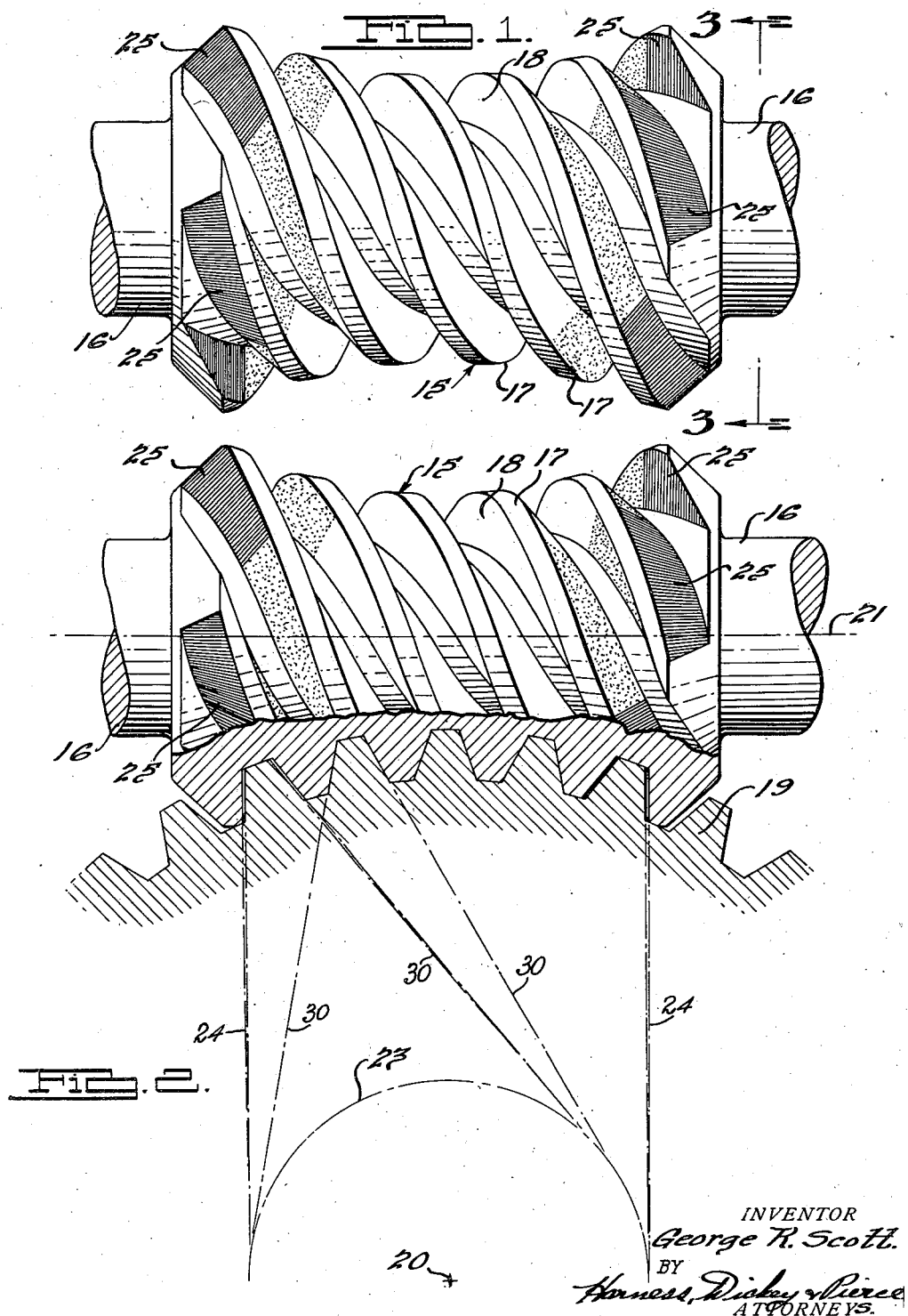
INVENTOR
*George R. Scott.*
BY
*Harness, Dickey & Pierce*
ATTORNEYS.

April 14, 1942. G. R. SCOTT 2,279,414
WORM FOR USE IN DOUBLE ENVELOPING WORM GEARING
Filed Oct. 24, 1940 2 Sheets-Sheet 2

INVENTOR
George R. Scott.
BY Harness, Dickey & Pierce.
ATTORNEYS.

Patented Apr. 14, 1942

2,279,414

UNITED STATES PATENT OFFICE 2,279,414

WORM FOR USE IN DOUBLE ENVELOPING WORM GEARING

George R. Scott, Detroit, Mich.

Application October 24, 1940, Serial No. 362,492

8 Claims. (Cl. 74—458)

This invention relates generally to worm gearing. More particularly, it relates to a novel and improved form of worm for use in worm gearing of the double enveloping type.

Still more specifically, the present invention relates to a modified form of thread structure to be used in connection with worm gearing in order to increase the possible bearing between the thread flanks of the worm and the tooth flanks of the wheel with which the worm is meshed when the same are carrying a heavy load. Still further, the invention relates to a worm which is designed and intended to produce substantially maximum bearing immediately without the necessity of lapping or wearing the worm into proper meshing engagement.

Smooth and quiet operation of worm gearing of this type are essential in most applications, and there has been recently a great increase in the demand for smooth and quiet operation. The type of gearing herein described embodies in practically all designs multiple tooth engagement. Consequently, in each convolution of each thread of the worm, one or more teeth are simultaneously under load while the entering end of the thread is about to engage an additional tooth. When any appreciable load is transmitted, the teeth already in engagement are always under deflection or compression as a result of the load being transmitted. The tooth on the worm wheel which is about to receive its proportion of the load is not subject to said deflection or compression.

Consequently, it will appear that in order to obtain smooth and quiet operation, some modification of the worm thread must be made in order that its entry between the teeth of the wheel and its departure therefrom will be smooth. It has been found that where a worm of the type disclosed has the flanks of its thread adjacent the ends slightly relieved, the load may be transmitted to the engaged tooth much more gradually and smoothly.

Consequently, the principal object of the present invention consists in the provision of a worm in which the thread flanks have been modified to insure quiet operation.

In order that a complete understanding of the present invention may be had, reference should first be given to the particular type of worm gearing to which the present invention relates. In order to obtain a more complete and better understanding of the general type of gearing to which the present invention relates, reference may be had to Cone Patents Nos. 1,885,686 and 1,822,800 which illustrate gearing of the generic type with which the present invention is concerned and over which the invention herein disclosed is an improvement.

From reference to the above mentioned patents, together with the following description, it will be seen that in the Cone type of double enveloping worm gearing, the flanks of the thread of the worm are sinuously warped surfaces, which surfaces are generated by a straight line element. This straight line element lies in a plane, passing through the axis of the worm and perpendicular to the axis of the wheel with which the worm is adapted to mesh. The intersections of these tooth flanks with this plane all lie along straight lines which are tangent to a circle whose center coincides with the axis of the wheel with which the worm is adapted to mesh.

It has been found that in gearing of this type the axial length of the working portions of the flanks of the thread of the worm cannot extend throughout a greater over-all axial distance than the diameter of the circle above mentioned to which the thread flanks are tangent.

Still further, it has been found that due to a certain limited inherent resiliency in the materials from which the worm and wheel are formed, both the entering and leaving ends of the thread flanks of the worm should be slightly and gradually relieved in order to obtain a smooth, full bearing between the worm and worm wheel when operating under conditions of reasonable load.

Bearing the above in mind, it is an object of the present invention to provide a worm for use in worm gearing of the generic type described above which will have a thread structure in which the over-all axial length of the bearing portions of the threads of the worm will be limited precisely within the diameter of the circle to which the thread flanks are tangent and at the same time provide a worm structure in which the ends of the threads for a substantial distance inwardly are relieved in order to provide smooth, full bearing between the worm and worm wheel when operating under conditions of reasonable load.

Many other and further objects, advantages, and features of the present invention will become fully apparent from the following description taken in conjunction with the accompanying drawings.

In the drawings:

Figure 1 is an elevational view of a worm embodying the improvements of the present invention.

Figure 2 is a fragmentary view of the worm shown in Figure 1 with portions in section illustrating the improved worm in mesh with a worm wheel.

Figure 3:
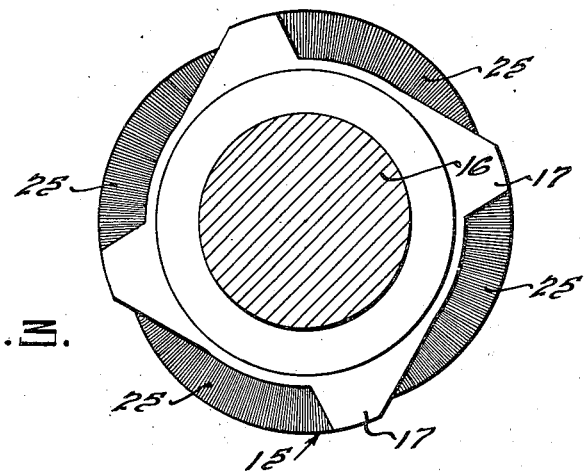
Figure 3 is an axial end or sectional view of the worm shown in Figure 2 of the drawings, taken substantially along the line 3—3 of Figure 2.

With more particular reference to the drawings, it will be readily understood that the novel worm structure disclosed therein is shown in two illustrative embodiments, both of which are designed and intended to produce a worm having the desirable characteristics of the present invention.

With reference to Figures 1 and 2, the worm 15 is illustrated as being formed integrally with a worm shaft 16 and comprises a plurality of identical threads 17 having flanks generally designated as 18. This worm is adapted to mesh with a wheel 19, a fragmentary portion of which is shown in section in Figure 2. The worm wheel 19 may be mounted for rotation about its axis 20. By reference to Figure 2, it will be seen that the flanks of the thread of the worm and the flanks of the teeth of the worm wheel are generated in such a manner that substantially full bearing from root to crest of each of the engaged teeth will be obtained and such that substantially maximum bearing from side to side of the teeth of the wheel will be obtained with the meshed flanks of the teeth of the worm. The portion of Figure 2 shown in section, is taken in a plane perpendicular to the axis 20 of the worm wheel which plane would pass through the axis 21.

It will be readily apparent that all of the flanks of not only the thread of the worm but the flanks of the teeth of the worm wheel intersect this plane in straight lines 30 which are tangent to a circle 23 whose center coincides with the axis of rotation 20 of the worm wheel. This circle is referred to herein and in the claims as the "base circle" because it serves to control the form of teeth on the worm and worm wheel, and is not to be confused with the base circle as commonly used in the art of involute gearing. In gearing of this type, it is generally recognized that it is essential that the teeth of the wheel and the thread of the worm be so formed as to obtain the above described condition in order that proper, full bearing, meshing engagement will be obtained.

It has been discovered that in the event the working portions of the thread flanks of the worm extend throughout an axial length of the worm greater than the diameter of the base circle 23, serious interferences immediately develop which, if an effort is made to run the worm in mesh with the wheel, will result in destruction of the desired tooth forms. Consequently, great care must be taken in the fabrication of worms of the type with which the present invention is concerned to insure the fact that the bearing portions of the thread flanks of the worm will not extend throughout an axial distance greater than the diameter of the base circle 23.

It will, however, be readily appreciated that the diameter of the base circle 23 may be arbitrarily chosen within predetermined limits by varying the pressure angle of the teeth of the gearing and, consequently, the axial distance throughout which the bearing portions of the worm threads may extend and still obtain satisfactory results will be governed definitely by the pressure angle of the teeth of the gearing.

It is not necessary for a complete understanding of the present invention to discuss in detail the factors governing the selection of the pressure angle of the teeth of the gear and worm. It should be borne in mind, however, that the pressure angle of the teeth of any particular set of worm gearing of the type with which the present invention is concerned definitely and arbitrarily controls the size of the base circle 23 to which the tooth flanks are tangent. Since the diameter of the base circle 23 constitutes an absolute limit to the axial length of the worm throughout which the bearing pressure of the worm thread flanks may extend, the axial length of the bearing portion of the worm may be precisely ascertained in any particular instance.

Figure 4:
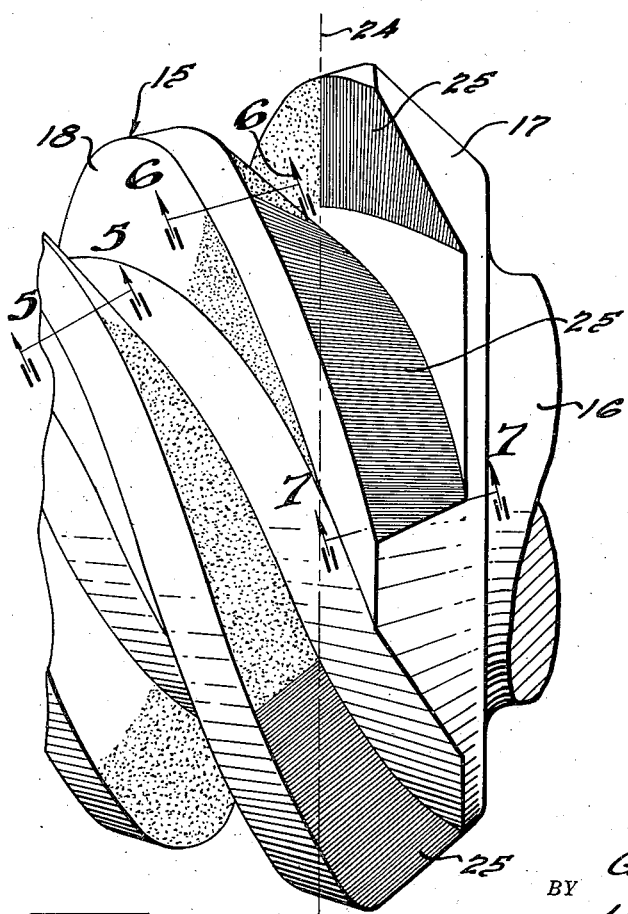
Figure 4 is a substantially enlarged, fragmentary elevational view of one end of the worm shown in Figures 1, 2, and 3, illustrating in an exaggerated manner the relief at the end of the worm threads.

Still further, it should be borne in mind that in gearing of this type in order to obtain the maximum contact between the flanks of the teeth of the wheel and the flanks of the thread of the worm, the bearing portions of the worm flanks should extend throughout as great an axial distance as possible in order to increase the area of contact and thereby increase the load carrying capacity and efficiency of the gearing. From a strictly theoretical standpoint, it will be appreciated that the maximum bearing between the teeth of the wheel and the threads of the worm would be obtained in the event the worm were cut off at each end in a plane perpendicular to the axis of the worm and tangent to the circle 23. This plane is illustrated by the lines 24 in Figs. 2 and 4. In the event such were done, however, the tooth ends of the worm would terminate in a feather edge, due to the helix angle of the thread of the worm, and the bearing portions of one thread flank on each thread adjacent to the end of the tooth would have very little strength. For this reason, it has been found extremely desirable to extend the threads of the worm beyond the plane perpendicular to the axis of the worm and tangent to the base circle 23 in order to provide a tooth structure of sufficient strength to support the bearing portion of the thread flank. In the event this is done, however, it is necessary to relieve the portions 25 of each thread flank which lie beyond the plane perpendicular to the axis of the worm and tangent to the base circle 23 in order that these portions 25 will be completely out of bearing engagement with the flanks of the worm wheel teeth in order to prevent setting up the destructive interference conditions heretofore mentioned.

This relief of the tooth ends must be sufficient to preclude these portions of the thread flank from bearing engagement with the teeth of the worm wheel and while the magnitude of this relief will, of course, be varied very substantially depending upon the size of the gear set and the load to be carried thereby, as well as the particular material from which the worm and gear are formed, the following is given as approximately the type of relief which may be found satisfactory on a gear set having six inch center distance and adapted for use in carrying relatively high loads.

In such a gear set, the relief may obtain a maximum of .030 of an inch at the extreme end of the tooth, tapering to a relief of somewhere between .005 and .010 of an inch, this relief constituting the non-bearing portion of the thread flank. In addition to the above relief, the bearing portion of the thread flank is relieved a maximum of .005 to .010 of an inch where it joins the non-bearing portion and progressively may be decreased over a considerable distance of the thread flank to merge with the main unrelieved portion of the thread flank.

Such a relief as that described above at the ends of the worm threads wil be sufficient to provide adequate strength and support for the bearing portion of the flank of the thread of the worm at the end thereof and will at the same time provide a structure in which the portions of the worm threads which extend beyond the plane perpendicular to the axis of the worm and tangent to the base circle 23 will at no time have any bearing engagement with or interference with the teeth of the worm wheel with which the worm is meshed.

The relief 25 on the extreme ends of the thread of the worm is referred to as an acute relief because sufficient metal is removed from the flank of the worm thread in this zone to preclude any bearing engagement with the flanks of the teeth of the worm wheel with which the worm is adapted to mesh. It will be noted by reference to the drawings that this acute relief is carried inwardly from the axial ends of the worm threads on both sides of the worm thread so that all portions of the flanks of the worm thread lying outside the planes perpendicular to the axis of the worm and tangent to the base circle are acutely relieved.

The flanks of the worm thread axially inwardly toward the center of the worm from these acutely relieved flank portions are referred to as the bearing portions of the flanks of the worm because it is these portions of the flanks of the worm thread and these alone which engage the flanks of the teeth of the worm wheel when the worm and wheel are in meshing engagement.

The bearing portions of the flanks of the worm thread are also provided with a relief which is referred to herein as a gradual relief. The magnitude of this relief is extremely small and is illustrated in the drawings in exaggerated form in order that the general nature of the relief will be clearly apparent. This gradual relief is of maximum magnitude adjacent the ends of the teeth and merges into the acute relief smoothly. As has been pointed out above, the acute relief may, at the extreme ends of the teeth, reach a magnitude, for example, of .030 of an inch, then decreases in magnitude to .005 or .010 of an inch at the point where it merges with the gradual relief. The gradual relief will, of course, be of greatest magnitude, that is .005 to .010 of an inch, at the point where it merges with the acute relief and decreases in magnitude inwardly axially along the flank of the thread to zero. It will, of course, be understood that the above figures given for the magnitude of the relief depend entirely upon the characteristics of the particular gear set and may be varied in accordance with the size of the gears, the loads to be carried thereby, and the materials from which the gear and worm are formed.

Figure 5:
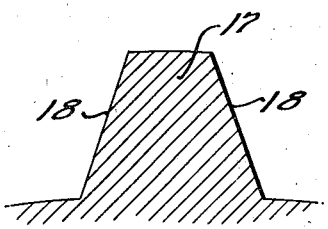
Figure 5 is a fragmentary, sectional view taken substantially on the line 5—5 of Figure 4, illustrating in detail the cross-sectional configuration of the thread of the worm.
Figure 6:
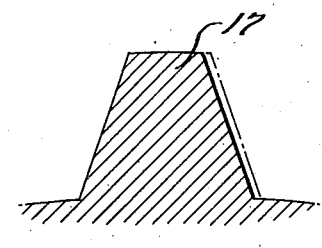
Figure 6 is a fragmentary, sectional view taken substantially on the line 6—6 of Figure 4 illustrating in detail the cross-sectional configuration of the thread of the worm adjacent the end thereof.
Figure 7:
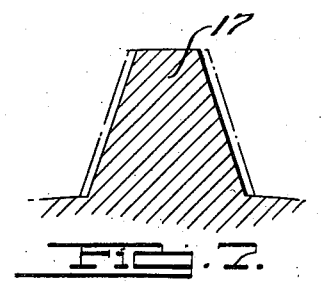
Figure 7 is a fragmentary, sectional view taken substantially on the line 7—7 of Figure 4, illustrating the cross-sectional configuration of the thread of the worm adjacent the extreme end thereof.

As is clearly illustrated by Figure 5 of the drawings, the worm thread in the axial central portion of the worm is substantially identical in configuration with the interdental spaces between the teeth of the wheel with which it is adapted to mesh at the mid-plane thereof. As the ends of the teeth are approached, the gradual relief begins and increases in magnitude from zero to .005 to .010 of an inch at the point where it merges with the acute relief. This gradual relief, like the acute relief, is provided on both sides of the teeth.

The distance axially inwardly throughout which this gradual relief may extend depends upon a number of factors, but in general it has been found satisfactory if it extends throughout perhaps a quarter or half turn of the thread. If the worm gear assembly is adapted for an installation where there are to be encountered extremely high or widely varying loads, it will obviously be desirable to increase the magnitude and length of the gradual relief portion. While, on the other hand, in the event a gear set is to be used in an installation where fairly constant loads are encountered and where a minimum of backlash is required, the gradual relief may be relatively small in magnitude and relatively short in length.

It will be readily apparent that many other and further modifications of the invention may be made falling within the scope thereof as defined in the subjoined claims.

What is claimed is:

1. A worm for use in a double enveloping system of worm gearing, said worm having a thread with flanks thereon adapted to engage the teeth of a mating worm wheel, said thread flanks being sinuously warped whereby a plane passing through the axis of said worm will form straight line intersections with said thread flanks and said straight line intersections will in extension be tangent to a common base circle, at least a portion of said thread flanks being provided with a gradually increasing relief toward the ends of the bearing portions thereof whereby to obtain maximum bearing under load.

2. A worm for use in a double enveloping system of worm gearing, the thread of said worm having sinuously warped flanks, whereby a plane passing through the axis of said worm will form straight line intersections with said thread flanks, and said straight line intersections will in extension be tangent to a common base circle, said thread flanks being acutely relieved at their ends to limit said thread flanks to bearing portions having an overall axial length less than the diameter of said base circle, at least a part of the bearing portions of said thread flanks being provided with a gradually increasing relief toward the ends thereof whereby to obtain maximum bearing under load.

3. A worm of the double enveloping type having thread flanks composed of bearing and non-bearing portions, the bearing portions of said thread of said worm being generated by straight line elements tangent to a common base circle, the bearing portions of said thread flanks having the surfaces thereof relieved with a maximum relief at the ends of the thread, the magnitude of said relief progressively decreasing inwardly from the axial ends of said threads whereby to obtain maximum bearing under load.

4. A worm for use in worm gearing having a sinuous thread flank, a portion of said thread flank at the end thereof being relieved to preclude said portion from engaging the flanks of the teeth of the worm wheel with which said worm is adapted to mesh, said relief being of greatest magnitude at the extreme end of the thread flank and of progressively decreasing magnitude inwardly from said end, a second portion of said thread flank immediately adjacent said first mentioned portion being relieved to a minor extent but said last mentioned relief being insufficient to preclude engagement of said second portion with the flanks of the teeth of a worm wheel with which said worm is adapted to mesh when the worm and wheel are under substantial load.

5. A worm for use in worm gearing having thread flanks composed of non-bearing portions adjacent the ends thereof and bearing portions intermediate said non-bearing portions, the bearing portions of said thread flanks being relieved to reduce slightly the tooth thickness, said relief being of greatest magnitude adjacent the junction of said bearing portion with said non-bearing portions and gradually decreasing in magnitude inwardly toward the center of said worm, all of the bearing portions of said thread flanks being of sinuous form whereby the lines of intersection of said thread flanks with a plane passing through the axis of said worm will be straight lines all lying tangent to a common base circle whose center coincides with the axis of a worm wheel with which said worm is adapted to mesh, the over-all axial length of the bearing portions of said thread flanks, being no greater than the diameter of said base circle.

6. A worm for use in worm gearing having thread flanks composed of non-bearing portions adjacent the ends thereof and bearing portions intermediate said non-bearing portions, the bearing portions of said thread flanks being of sinuous form whereby the lines of intersection of said thread flanks with a plane passing through the axis of said worm will be straight lines all lying tangent to a common base circle, the bearing portions of said thread flanks of said worm extending through an axial distance no greater than the diameter of said base circle and the over-all axial length of said thread flanks including both the bearing and non-bearing portions being greater than the diameter of said base circle.

7. A worm of the globoidal type having thread flanks composed of bearing and non-bearing portions, the bearing portions of said thread flanks being generated by straight line elements tangent to a common base circle, the bearing portions of said thread flanks having an axial length no greater than the diameter of said base circle, the combined axial length of the bearing and non-bearing portions of said worm being greater than the diameter of said base circle.

8. A worm of the globoidal type having thread flanks composed of non-bearing portions lying outside parallel planes tangent to the base circle from which said thread flanks are generated, and bearing portions lying wholly within said parallel planes tangent to said base circle, said bearing portions comprising relieved portions and non-relieved portion, said non-relieved portions being located in the axial central portion of said worm.

GEORGE R. SCOTT.